Patented Dec. 29, 1936

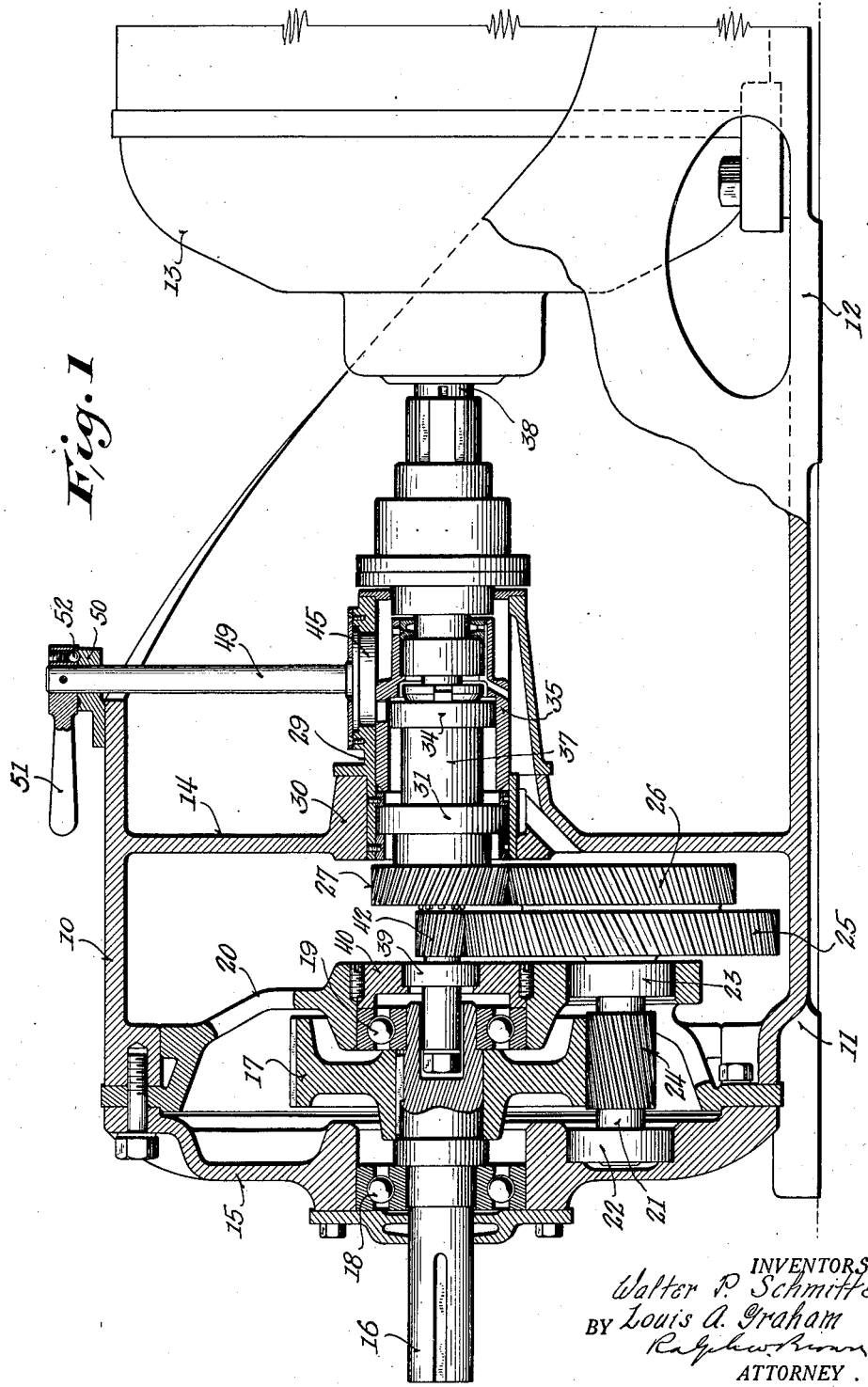

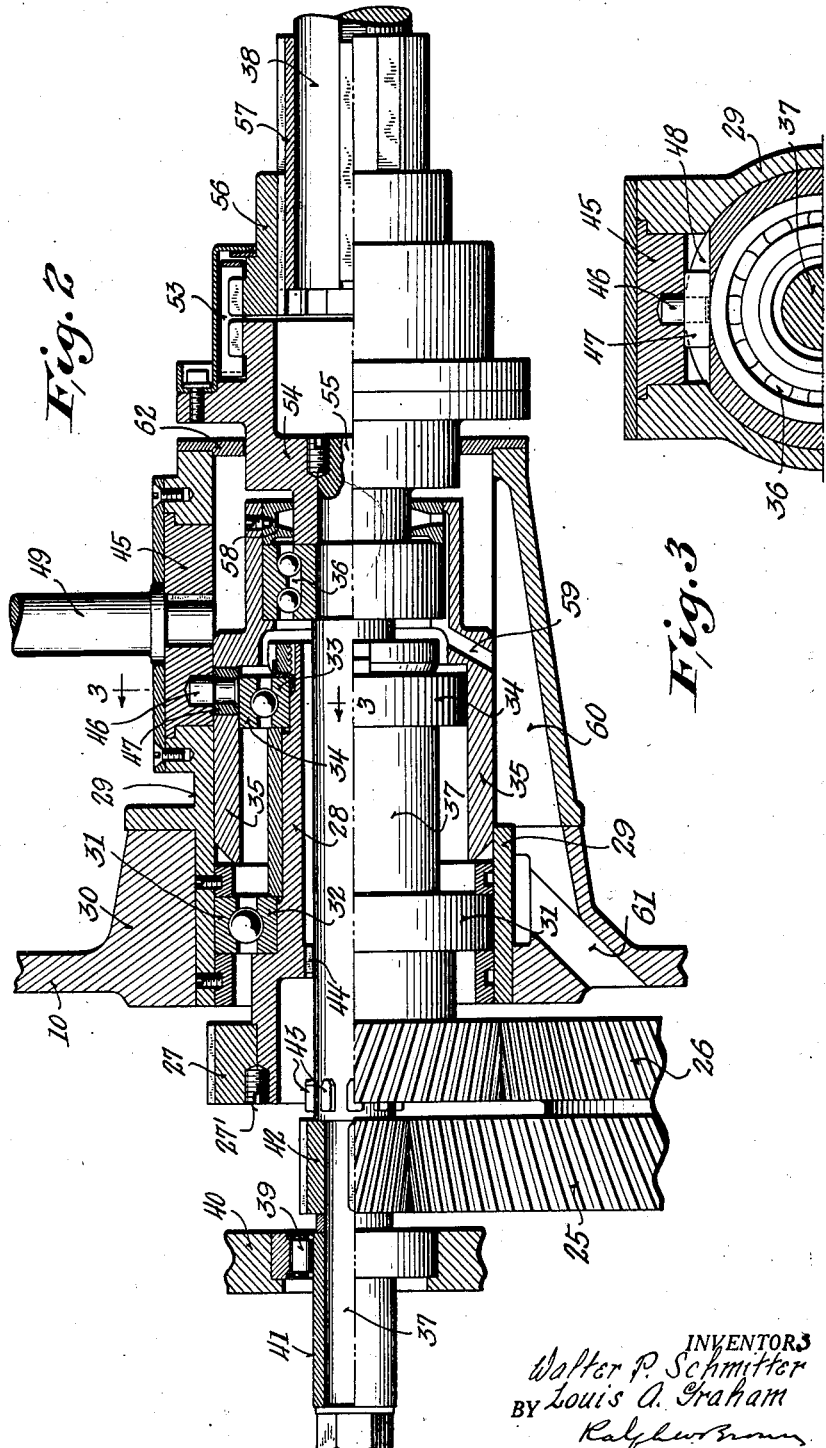

2,065,753

UNITED STATES PATENT OFFICE 2,065,753

MULTISPEED GEARED MOTOR

Walter P. Schmitter and Louis A. Graham, Milwaukee, Wis.

Application August 20, 1934, Serial No. 740,629

5 Claims. (Cl. 74—363)

This invention relates to multi-speed power units of the so called "motoreducer" type.

Power units of this type commonly comprise a speed reduction gear set, enclosed and supported by and within a housing to which an electric motor is attached, and through which the power of the motor is rendered available at a reduced speed appropriate for any particular industrial use. By reason of the reduction in speed thus afforded, relatively small high speed motors are commonly used, such combined units being today extensively employed throughout the industrial arts in place of the heavier and more expensive slow speed motors heretofore used. Furthermore these combined units eliminate the necessity for special beds such as were required when separate motors and speed reducers were employed.

A typical "motoreducer" is shown in the copending application of Walter P. Schmitter, Serial No. 682,542, filed July 28, 1933. The unit therein shown involves an arrangement wherein gears of various sizes may be employed to impart to the power output shaft any particular speed best suited for a given installation, but in many instances a plurality of speeds is desirable.

An object of the present invention is to provide a change speed device which may be readily incorporated in the unit shown in said application.

Another object is to provide a change speed mechanism in the high speed end of a multi-stage speed reducer so that the change speed mechanism will not be subjected to the heavy torques involved in the low speed end and so as not to disturb or interfere with the adequate support of those heavy torque carrying gears at the low speed end of the unit.

Other more specific objects and advantages will appear, expressed or implied from the following description of an illustrative embodiment of the present invention.

In the accompanying drawings:—

Figure 1 is a longitudinal sectional view of a multi-speed power unit constructed in accordance with the present invention.

Fig. 2 is a sectional view on a larger scale of the change speed mechanism shown in Fig. 1.

Fig. 3 is a sectional view taken along the line 3—3 of Fig. 2.

The power unit selected for illustration is similar in many respects to that shown in the copending application hereinabove identified. It comprises a housing 10 having a mounting base 11 rearwardly extended, as at 12, to receive and support a conventional electric motor 13. The gear enclosing portion of the housing is separated from the motor by a partition 14 and is closed by an end head 15 removably secured to the forward end of the housing.

A power take-off shaft 16, carrying a gear 17, projects forwardly from the housing. This shaft is journalled at 18 in the end head 15 and at 19 in a bearing support 20, mounted in the housing and removable therefrom with the end head. The shaft 16 is driven at reduced speed from a countershaft 21, also journalled at 22 in the head 15 and at 23 in the support 20, the shaft 21 carrying a pinion 24 which meshes with gear 17.

In this instance the countershaft 21 is driven at either of two speeds from the motor 13 through a speed-reducing, change-speed mechanism preferable such as will now be described. For this purpose a double gear, including a large gear 25 and smaller gear 26, is fixed to the rear end of the countershaft.

The smaller gear 26 is permanently engaged with an externally toothed ring gear 27 fixed by lock screws 27', or otherwise, to the forward end of a hollow shaft 28. The shaft 28 is supported in and projects forwardly from a cartridge 29 removably anchored at its forward end in a central hub 30 formed in the partition 14. An anti-friction bearing, having an outer race ring 31 anchored to and within the cartridge 29 and an inner race ring 32 fixed to the shaft 28 supports the forward end of the shaft; and another anti-friction bearing, having an inner race ring 33 fixed to the rear end of the shaft 28 and an outer race ring 34 slidably engaged with a sleeve 35, supports the rear end of the shaft. The hollow shaft 28 and gear 27 are thus adequately supported for rotation about an axis coincident with the longitudinal axis of the cartridge 29.

The sleeve 35 is closely fitted for longitudinal adjustment within the cartridge 29 and carries an endthrust anti-friction bearing 36 which is fixed to and supports the rear end of a shaft 37. The shaft 37 is coaxial with the motor shaft 38, with the cartridge 29, and with the power take-off shaft 16, and is supported at its forward end by an anti-friction bearing 39 whose outer race ring is fixed in a bushing 40 provided in the bearing support 20. An extended sleeve 41 removably fixed to the forward end of the shaft 37 provides an adequate raceway for the bearing 39 in all longitudinal positions of the shaft.

A pinion 42, fixed to the shaft 37, is axially shiftable therewith into and out of engagement with the larger gear 25; and clutch teeth 43, formed on the shaft, are shiftable therewith into and out of engagement with mating clutch teeth 44, formed on the inside of the hollow shaft 28. The arrangement is such that when the shaft 37 is projected into the forward position shown, the pinion 42 meshes with the larger gear 25 and the countershaft 21 is driven at a speed less than the speed of the shaft 37 and at a rate determined by the relative diameters of the pinion 42 and gear 25. In this position of the shaft 37, clutch teeth 43 are disengaged from teeth 44 so that the hollow shaft 28, with its gear 27 in mesh with gear 26, is free to idle within the cartridge 29.

By shifting the sleeve 35 rearwardly the shaft 37 may be retracted, so as to withdraw the pinion 42 from engagement with gear 25 into the gear 27, and so as to engage the clutch teeth 43 with teeth 44. In that position of the parts, the hollow shaft 28 is locked for rotation with the shaft 37 and the countershaft 21 is driven through the gears 27 and 26 at a speed less than that of the shaft 37. It will be noted, however, that with the shaft 37 thus retracted the speed of the countershaft 21 will be greater than when the shaft 37 is advanced, because the gear 27 is larger than the pinion 42.

Various means may be provided for thus shifting the shaft 37, but that shown has proven wholly adequate for the purpose. It includes the sleeve 35 and a control disk 45 rotatably seated in the cartridge 29. A depending pin 46 eccentrically fixed in the disk 45 projects into a slide block 47 guided in a cross slot 48 formed in the sleeve 35, so that when the disk is rotated through an angle of one hundred eighty degrees from the position shown the pin 46 and block 47 coact with the slot 48 to retract the sleeve 35 and the shaft 37 to the second position above described, and a similar reverse rotation of the disk will return the shaft 37 to the position shown.

The disk 45 is preferably actuated and controlled by a shaft 49 keyed thereto at its lower end and journalled at its upper end in an appropriate bracket 50 fixed to the top of the housing 10. The shaft shown is equipped with an operating handle 51 and a suitable detent 52 for yieldably retaining the control mechanism in either of the two positions above described.

The shaft 37 is operatively connected to the motor shaft 38 in a manner to permit the longitudinal adjustment of the shaft 37 above described. In this instance this connection includes a flexible coupling 53 of a well known type having an elongated hollow hub 54 fixed to the end 55 of the shaft 37 and a similarly extended hub 56 splined onto a sleeve 57 keyed or otherwise fixed to the motor shaft 38. The coupling and its hub 56 are free to slide lengthwise of the sleeve 57 to accommodate the lengthwise adjustment of the shaft 37.

The several bearings 31, 34, and 36 are lubricated by oil splashed into the cartridge 29 from the gear housing 10 and by oil that may creep rearwardly along the shafts 28 and 37 from the gear 27 and pinion 42. An appropriate oil seal in the form of a ring 58 fixed in the rear end of the sleeve 35 serves to halt further creepage of this oil. Oil discharged from these bearings are returned to the housing through appropriate ducts and channels 59, 60, and 61. The rear end of the cartridge 29 is closed by a ring 62 which is fitted closely to the clutch hub 54.

Various changes may be made in the embodiment of the invention hereinabove specifically described without departing from or sacrificing the advantages of the invention as defined in the appended claims.

We claim:—

1. In a power unit the combination of a housing, a power take-off shaft journalled therein and projecting therefrom, a countershaft journalled in said housing, speed reduction gearing through which said first named shaft is driven from said countershaft, two gears fixed to said countershaft, a hollow shaft, a gear thereon meshing with one of said gears, a longitudinally moveable drive shaft extending through said hollow shaft, a gear fixed to said drive shaft and engageable with the other of said gears when said drive shaft is in one position, and cooperating clutch elements on said drive shaft and said hollow shaft engageable to drive said hollow shaft when said drive shaft is in another position.

2. In a power unit the combination of a housing, a shaft journalled therein, two gears fixed to said shaft, a hollow shaft journalled in said housing, a gear on said hollow shaft engaged with one of said first named gears, a longitudinally shiftable drive shaft within said hollow shaft and projecting therefrom, a gear on said drive shaft, a clutch between said drive shaft and hollow shaft, and means for shifting said drive shaft to alternatively engage said last named gear with the other of said first named gears or to close said clutch.

3. In a power unit the combination of a housing, a shaft journalled therein, two gears fixed to said shaft, a hollow shaft journalled in said housing, a hollow gear on said hollow shaft engaged with one of said gears, a drive shaft within said hollow shaft, a gear on said drive shaft engageable with the other of said first named gears, said drive shaft being longitudinally shiftable to disengage said last named gear and enter the same into said hollow gear, and means for effecting a driving connection between said drive shaft and hollow shaft when said drive shaft is thus shifted to disengage said gear.

4. In a power unit the combination of a housing, a shaft journalled therein, two gears fixed to said shaft, a hollow shaft journalled in said housing, a gear on said shaft engaged with one of said gears, a drive shaft within said hollow shaft, a bearing for one end of said drive shaft shiftable to move said drive shaft longitudinally, a bearing for the other end of said drive shaft, a gear on said drive shaft between said bearings and movable with said drive shaft into and out of engagement with the other of said first named gears, and clutch means effective to connect said drive shaft with said hollow shaft when said drive shaft is shifted to disengage said last named gear.

5. In a power unit the combination of a housing, a shaft journalled therein, two gears on said shaft, a cartridge attached to said housing and removable axially therefrom, a drive shaft and a surrounding hollow shaft journalled in said cartridge, gears on said drive shaft and hollow shaft cooperable with said first named gears to drive said first named shaft, and means supported by said cartridge for rendering one or the other of said last named gears alternatively effective to drive said first named shaft.

WALTER P. SCHMITTER.
LOUIS A. GRAHAM.